United States Patent Office 2,829,710
Patented Apr. 8, 1958

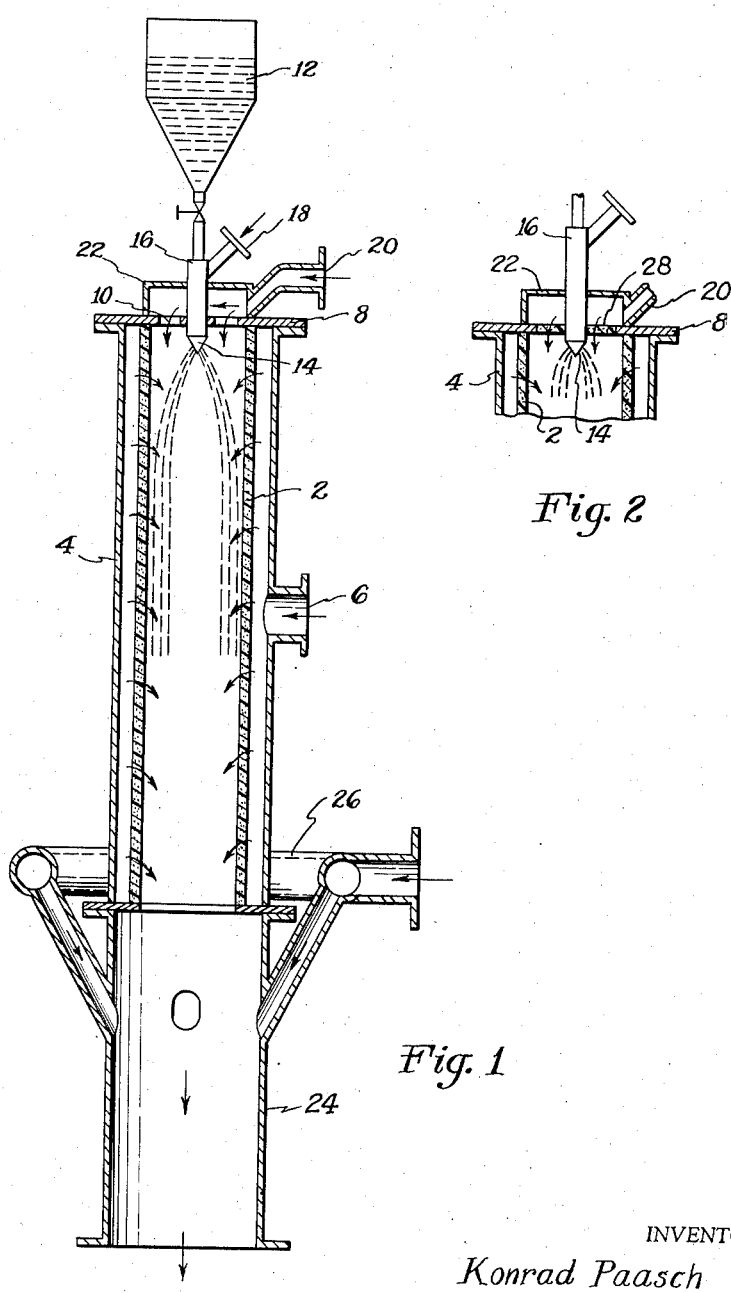

2,829,710

ATOMIZING DRYER

Konrad Paasch, Offenbach (Main), Germany, assignor to The Deutsche Gold- und Silber-Scheideanstalt vormals Roessler, Frankfurt am Main, Germany, a corporation of Germany Application October 7, 1953, Serial No. 384,542

Claims priority, application Germany January 11, 1951

3 Claims. (Cl. 159—4)

This invention relates to an atomizing dryer. In particular the invention is directed to a dryer for separating solids from liquids by means of hot drying gases.

This application is a continuation-in-part of application S. N. 263,263, filed December 26, 1951, for "Atomizing Dryer."

In known dryers a liquid containing solids either in solution or suspension is sprayed into a chamber, and a stream of gas heated to above the boiling point of the liquid is introduced into the chamber in contact with the spray. The liquid is thereby vaporized, the solids precipitated, and then separated from the gas in a separator or filter. Such apparatus heretofore necessarily has been large as the separation of the solids from the vaporized liquid should occur away from the walls of the container. Even so, the difficulty persists in that solid matter is deposited on the walls of the container to form crusts and agglomerates which thwart the object obtaining finely divided particles of solid matter.

The objects of the instant invention are to produce an apparatus of small size, and in which solids are separated from vaporized liquids in finely divided form and without forming crusts or agglomerates within the container.

In general, these objects of the invention are obtained by constructing a mixing or drying chamber having a finely porous wall through which hot gas is introduced into the container. Atomized liquid is sprayed into the container and mixed with the hot gas, but the liquid is prevented from contacting the walls of the container because of the pressure of the gas passing through the porous wall over substantially the entire area thereof. Consequently the solids separated from the vaporized gas can be passed in finely divided form from the mixing chamber into a separator or filter.

The means by which the objects of the invention are obtained are disclosed more fully with reference to the accompanying drawing, in which:

Figure 1 is a cross-sectional view of an apparatus constructed according to the invention; and Figure 2 is a modified view of a detail.

A cylindrical porous tube 2 having a thickness of from 10 to 30 mm. forms the mixing or drying chamber. This tube is composed of a porous ceramic, or a porous body such as is obtained from sintered metal powder. Ceramic materials such as fire clay, alumina, quartz sinter, and infusorial earth may be used. Powder metals such as copper, and alloys thereof such as brass and bronze, and porous iron can be used.

Both the ceramic and metallic tubes are characterized by a pore size of less than $500\mu$, preferably in the range of from 20 to $160\mu$. The gas permeability of a tube formed of these materials ranges between 20 and 200 cubic meters per square meter of wall area per hour and more, for a wall having a thickness of from 10 to 30 mm. The pressure drop, or excess pressure required to produce the above flow of gas through the tube wall ranges between 20 and 200 mm. of water.

As a specific example, a tube 2 is constructed from a porous fire clay having a pore size of $90\mu$, and a wall thickness of 10 mm. This tube has a gas permeability of 35 cubic meters per square meter of wall area per hour, with a pressure drop in the wall of 20 mm. of water.

The pores in wall 2 are irregularly shaped, and in an exaggerated comparison are more like the pores in a sponge as distinguished from the pores in a wire screen. Because of their irregular nature, the gas is uniformly distributed over the inner surface of tube 2. It is therefore possible to use comparatively small quantities of gas, and small pressure drops.

Tube 2 is closed within housing 4. Hot gases are introduced into housing 4 through conduit 6. The finely porous nature of wall permits the use of only one inlet conduit 6, and at the same time produce a substantially uniform gas pressure in the space between tube 2 and wall 4. Thus, the gas passes through tube 2 uniformly over the entire surface thereof, and forms a barrier layer of gas evenly distributed over the inner surface of tube 2.

The top of the housing 4 is closed off by cover 8, said cover having apertures 10 communicating with the mixing chamber formed by tube 2. If desired, as shown in Figure 2, cover 8 can be constructed so that the portion 28 overlying the mixing chamber has a porous nature similar to that described for tube 2.

Liquid to be vaporized is contained in a tank 12 connected to the mixing chamber through nozzle 14. This nozzle may be provided with a gas jacket 16 adapted to be supplied with hot gas through conduit 18. Hot gas can thus be added to the liquid in nozzle 14. Hot gas is conducted to apertures 10 through cover 8 by conduit 20 and manifold 22.

Beneath tube 2 lies a cooling and separating chamber 24 which is supplied with cooling gas through manifold 26.

In operation, the liquid containing solids in suspension or solution is placed in tank 12 from which it flows through nozzle 14 and therein atomized and sprayed into the mixing chamber. Hot gases having a temperature above the boiling point of the liquid are supplied through conduit 6 and passed through the porous wall of tube 2, the pressure of the gas being regulated so that the vaporized liquid is kept out of contact with the inner wall surface of tube 2. The gas and atomized liquid are mixed and the mixture passed into chamber 24. As the liquid is vaporized by the gas, the solid material is precipitated out in finely divided form so that it can be collected in chamber 24, or the mixture of solids and vapor passed on to some other separating unit or filter.

In order that a thorough mixing of the heated gases and the atomized liquid may be accomplished as quickly as possible hot gases may be introduced at the vaporizing nozzle 14 through jacket 16, thus securing an initial mixing and heating of the liquid. Further gases may be introduced into the chamber through apertures 10 in cover 8, these gases comprising up to two-thirds of all the gas used and ensuring a bountiful supply of hot gas in the mixing chamber, and creating a pressure to force the mixture of gas and atomized liquid in a streamline flow toward the chamber 24. The supplying of the gases to the mixing chamber in this manner, together with the gas supplied through the porous wall of tube 2 ensures a very thorough and rapid mixing of the gases with the atomized liquid, and enables the construction of an apparatus of much smaller dimensions than heretofore used. The cooling of the gases is accomplished by introducing cooling gases, which also have a temperature above the boiling point of the liquid, through manifold 26.

The apparatus permits the separation of solids from liquid in a uniform finely divided state, objectionable crusts or agglomerates being avoided because no precipitation takes place against the walls of the mixing chamber.

Having now described the means by which the objects of the invention are obtained, I claim:

1. An atomizing dryer for separating solids from liquids comprising a mixing and drying chamber having a vertical porous wall with pore sizes less than 500 microns and a gas permeability ranging from 20 to 200 cubic meters per square meter of wall area per hour under a gas pressure of from 20 to 200 mm. of water, means for introducing atomized liquid into the upper one end of said chamber and removing both separated solids and gases from the same opening in the bottom end of said chamber, and means including a pressure means for conducting hot gases into said chamber under the said pressures through substantially the entire surface area of said wall for forming a hot gas pressure layer uniformly distributed over the inner wall surface of said chamber to keep the atomized liquid and separated solids from contacting the inner wall surface.

2. An atomizing dryer as in claim 1, said wall being composed of a material selected from the class consisting of fire clay, alumina, quartz sinter, and infusorial earth.

3. An atomizing dryer as in claim 1, said introducing means comprising a manifold for said chamber, means for introducing gas into said manifold, and a porous cover between said manifold and said chamber.

References Cited in the file of this patent

UNITED STATES PATENTS

| | | |
|---|---|---|
| 31,343 | Walton | Feb. 5, 1861 |
| 909,460 | Schrade | Jan. 12, 1909 |
| 924,561 | Mecredy | June 8, 1909 |
| 1,163,339 | Hauss | Dec. 7, 1915 |
| 1,223,033 | Cole | Apr. 17, 1917 |
| 1,634,640 | Zizinia | July 5, 1927 |
| 1,724,627 | Varnau | Aug. 13, 1929 |
| 1,742,478 | MacLachlan | Jan. 7, 1930 |
| 1,774,350 | Bowen | Aug. 26, 1930 |
| 1,958,702 | Johnston | May 15, 1934 |
| 1,971,852 | Goebels | Aug. 28, 1934 |
| 2,038,451 | Schattaneck | Apr. 21, 1936 |
| 2,444,383 | Stynler | June 29, 1948 |

FOREIGN PATENTS

| | | |
|---|---|---|
| 382,129 | Great Britain | Oct. 20, 1932 |